United States Patent
Couturier

(10) Patent No.: US 11,460,002 B2
(45) Date of Patent: Oct. 4, 2022

(54) BLADE VIBRATION SUPPRESSION SYSTEM FOR A WIND TURBINE AND ASSOCIATED METHOD

(71) Applicant: Siemens Gamesa Renewable Energy A/S, Brande (DK)

(72) Inventor: Philippe Couturier, Lafayette, CA (US)

(73) Assignee: SIEMENS GAMESA RENEWABLE ENERGY A/S

( * ) Notice: Subject to any disclaimer, the term of this patent is extended or adjusted under 35 U.S.C. 154(b) by 361 days.

(21) Appl. No.: 16/665,186

(22) Filed: Oct. 28, 2019

(65) Prior Publication Data

US 2021/0123415 A1    Apr. 29, 2021

(51) Int. Cl.
*F03D 7/02* (2006.01)
*F16F 15/30* (2006.01)

(52) U.S. Cl.
CPC ............ *F03D 7/0296* (2013.01); *F16F 15/30* (2013.01); *F05B 2260/96* (2013.01)

(58) Field of Classification Search
CPC ................ F03D 7/0296; F05B 2260/96; F05B 2260/964
See application file for complete search history.

(56) References Cited

U.S. PATENT DOCUMENTS

| | | | |
|---|---|---|---|
| 4,025,230 A | 5/1977 | Kastan | |
| 4,302,152 A * | 11/1981 | Jensen | F03D 1/0608 416/18 |
| 4,518,313 A * | 5/1985 | Jensen | F03D 80/00 416/18 |
| 9,896,959 B2 | 2/2018 | Bertolotti et al. | |
| 2012/0107116 A1* | 5/2012 | Obrecht | F03D 7/0296 416/1 |
| 2012/0303277 A1 | 11/2012 | Fu et al. | |
| 2019/0226457 A1 | 7/2019 | Bertolotti | |

FOREIGN PATENT DOCUMENTS

EP    2527651 A2    11/2012

OTHER PUBLICATIONS

European Search Report for Application No. 20200725.8, dated Mar. 29, 2021.

* cited by examiner

*Primary Examiner* — Richard A Edgar
(74) *Attorney, Agent, or Firm* — Schmeiser, Olsen & Watts LLP

(57) ABSTRACT

A vibration suppression system and method for a wind turbine comprising blades is provided. The system comprises, for each blade, a stabilization system comprising a gyroscope with a control axis extending in a first direction, a first rigid body control axis extending in a second direction different from the first direction, a second rigid body control axis extending in a third direction different from the first and second directions and a flywheel rotatable in respect of the control axis and free to move in respect of at least one of the rigid body control axes. The stabilization system comprises an actuator to apply a torque over the gyroscope, and a respective sensor to detect the motions of each blade. The suppression system comprises a control device for controlling the actuation of the actuators according to said detections, in order to suppress unwanted motions of the blades.

15 Claims, 2 Drawing Sheets

BLADE VIBRATION SUPPRESSION SYSTEM FOR A WIND TURBINE AND ASSOCIATED METHOD

FIELD OF TECHNOLOGY

The disclosed relates to blade vibration suppression systems for wind turbines and to associated methods, that are used to suppress, at least partially, motions of the blades of the wind turbines.

BACKGROUND

A wind turbine comprises a hub, a spinner defining an inner protection space wherein the hub is arranged in a protected manner, a plurality of blades attached to the hub (normally three homogeneously arranged in respect of a central axis), a nacelle facing the spinner, a generator arranged in the nacelle, a generator shaft connecting the generator to the hub and a tower (mast) supporting the other elements and fixed to the ground or to a platform, for example. When the blades and the hub turn in respect of the central axis due to the action of the wind, this turn is transmitted to the generator through the generator shaft, and the generator transforms this turn (mechanical energy) into electrical energy.

It is known that the blades of the wind turbines suffer vibrations (unwanted motions) due to different circumstances such as external loads (wind and gravity, for example), especially when they are excited near their resonance, and said vibrations can cause a life-shortening or a damage of the blades. Therefore, it is desirable to eliminate or compensate said vibrations, at least partially, in order to increase the life of the blades.

Different methods for solving this drawback are known, namely active methods and passive methods. Passive methods are based on structural tailoring which do not require external energy input or an active controller, as the one disclosed in EP2808541A2. In contrast, active methods, as the one disclosed in US2010014971A, require external energy and/or an active controller. The method disclosed in the latter document comprises a pitch control of the wind turbine and modifies the pitch control to solve the aforementioned drawbacks. However, this modification could cause a reduction in the effectiveness of energy production.

SUMMARY

An aspect of embodiments of the invention is to provide a blade vibration suppression system for a wind turbine, a wind turbine comprising such a blade suppression system, and a method for suppressing, at least partially, the vibration of the blades of a wind turbine, as defined in the claims.

A wind turbine comprises a plurality of blades. The wind and/or gravity (and/or other external factor) acting on a blade of the wind turbine may result in unwanted motions or torques of the blades that could damage said blades and could cause a life-shortening of said blades, as described before.

An aspect of embodiments of the invention refers to a blade vibration suppression system for a wind turbine, which is used for avoiding, or for reducing, the risk of the blades of the wind turbine for being damaged or for being caused a life-shortening. Another aspect of embodiments of the invention refers to the wind turbine comprising such a blade vibration suppression system.

The blade vibration suppression system is adapted for wind turbines. The wind turbine comprises a plurality of blades, preferably three, and the blade vibration suppression system comprises at least one actively controlled gyroscopic stabilization system for each blade.

Each gyroscopic stabilization system comprises:
 a gyroscope with a rotation control axis extending in a first direction, a first rigid body control axis extending in a second direction different from the first direction, a second rigid body control axis extending in a third direction different from the first and second directions, and a flywheel rotatable in respect of the rotation control axis and free to move in respect of at least one of the rigid body control axes,
 at least one flywheel drive actuator configured to apply a controlled torque over the gyroscope, and
 at least one sensor arranged on the corresponding blade and configured to detect the motions (vibrations) of said blade.

Preferably, the second direction is perpendicular to the first direction and the third direction is perpendicular to the first direction and to the second direction.

The blade vibration suppression system further comprises at least one control device communicated with the sensors and with the flywheel drive actuators of the gyroscopic stabilization systems. The control device is configured for receiving signals representative of the motions of the blades from the respective sensors, and for controlling the actuation of the flywheel drive actuators according to said respective received signals in order to act upon the respective gyroscopes and to generate reaction torques on said gyroscopes (and then on the corresponding blades) that oppose or counteract the detected motions of the blades (suppressing then, at least partially, said motions). Therefore, the motions of each blade can be compensated for or suppressed, at least partially, with the adequate actuation upon the corresponding gyroscopic stabilization system, and the negative effects caused by said motions can be easily eliminated or, at least, reduced in a great extent, even not affecting the effectiveness of the energy production.

In addition, the described advantages can be obtained without having to redesign the wind turbine and/or the blades of the wind turbine for supporting the proposed blade vibration suppression system, as the elements of said blade vibration suppression system can be applied, and operate, in any existing wind turbine and/or blade design.

Another aspect of embodiments of the invention refers to a method for suppressing the blade vibration of a wind turbine comprising a plurality of blades. The method is implemented by a blade vibration suppression system comprising at least one actively controlled gyroscopic stabilization system for each blade, wherein each gyroscopic stabilization system comprises a gyroscopic with a rotation control axis extending in a first direction, a first rigid body control axis extending in a second direction different from the first direction, a second rigid body control axis extending in a third direction different from the first and second directions and a flywheel rotatable in respect of the rotation control axis and free to move in respect of at least one of the rigid body control axes; and at least one flywheel drive actuator configured to apply a torque over the gyroscope. Preferably, the second direction is perpendicular to the first direction and the third direction is perpendicular to the first direction and to the second direction.

In the method, for each blade, motions of the corresponding blade are measured or detected and, according to said measurements, a controlled torque over the corresponding gyroscope is applied by the corresponding flywheel drive actuator, to generate reaction torques on said gyroscope (and then on the corresponding blade) that oppose or counteract the detected motions of the corresponding blade (suppressing, at least partially, said motions). The advantages described for the other aspects of embodiments of the invention are also obtained with the method.

These and other advantages and features of the invention will become evident in view of the figures and of the detailed description of the invention.

BRIEF DESCRIPTION

DETAILED DESCRIPTION

Figure 1:
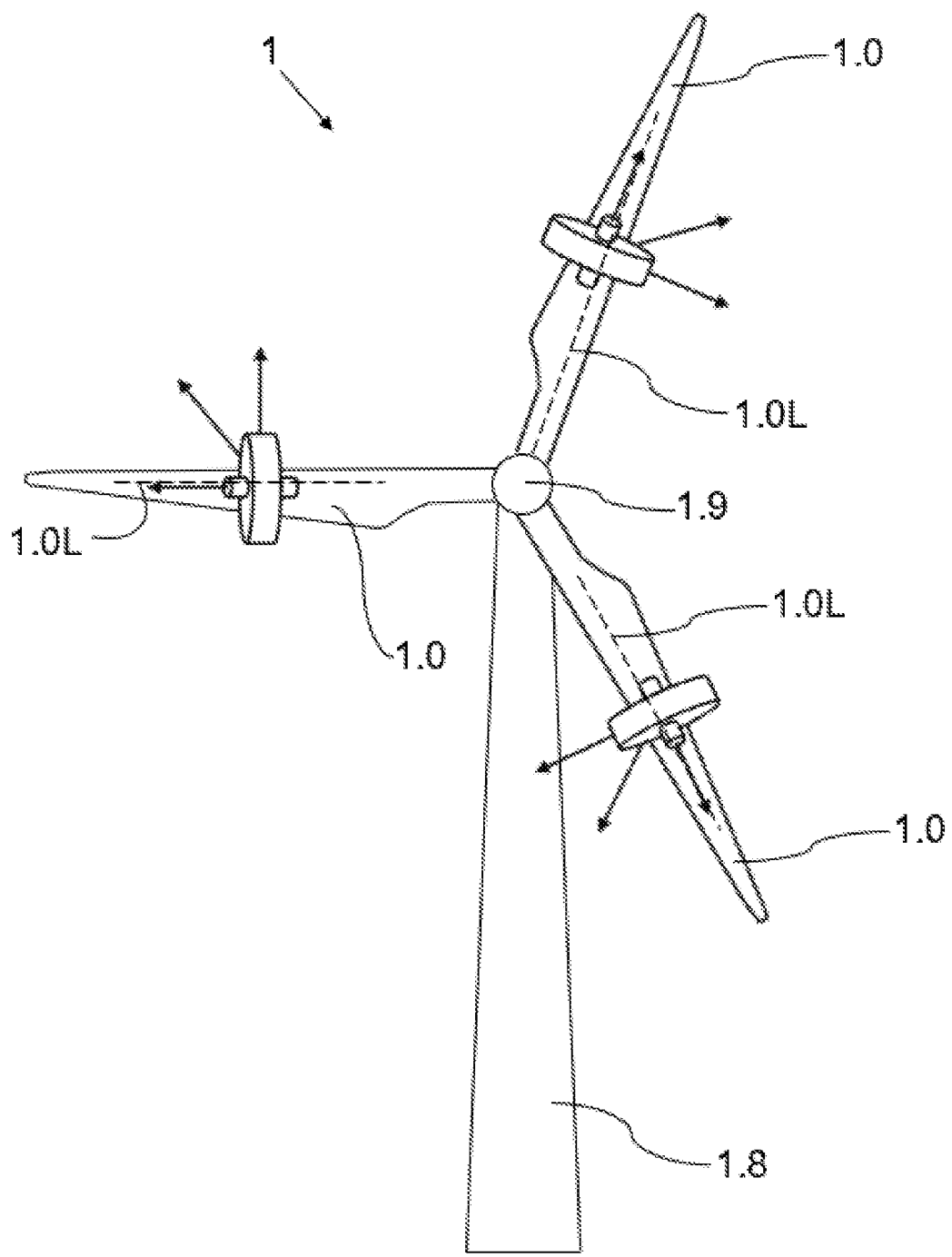
FIG. 1 is a schematic representation of a wind turbine comprising an embodiment of a blade vibration suppression system.

As it is shown in FIG. 1, a wind turbine 1 comprises a plurality of blades 1.0, normally three blades 1.0 homogeneously arranged in respect of a central axis 1.9 of the wind turbine 1, each blade 1.0 comprising a longitudinal axis 1.0L. The blades 1.0 are supported on a mast 1.8.

The wind and/or gravity (and/or other external factor) acting on a blade 1.0 of the wind turbine 1 may result in unwanted motions or torques (vibrations) of the blades 1.0 that could damage said blades 1.0, as described before.

One aspect of the embodiments of the invention refers to a blade vibration suppression system for a wind turbine 1, which is used for avoiding, or for reducing, the risk of the blades 1.0 of the wind turbine 1 for being damaged or for being caused a life-shortening. Another aspect of the embodiments of the invention refers to the wind turbine 1 comprising such a blade vibration suppression system.

The blade vibration suppression system comprises at least one actively controlled gyroscopic stabilization system associated to each blade 1.0, in order to generate torques over the blade 1.0 opposite to the unwanted torques (motions, vibrations) that could damage the blade 1.0, and at least one control device 200, communicated with all the actively controlled gyroscopic stabilization systems, in order to actively control said torques generated by the gyroscopic stabilization system. Therefore, a controlled actuation is provided over the blades 1.0, through the corresponding gyroscopic stabilization system, to suppress at least partially the unwanted motions of said blades 1.0. Preferably, the blade vibration suppression system comprises only one actively controlled gyroscopic stabilization system associated to each blade 1.0, but it could also comprise a plurality of actively controlled gyroscopic stabilization systems associated to each blade 1.0. Alternatively, it could also provide a different number of actively controlled gyroscopic stabilization systems for the different blades 1.0.

Figure 2:
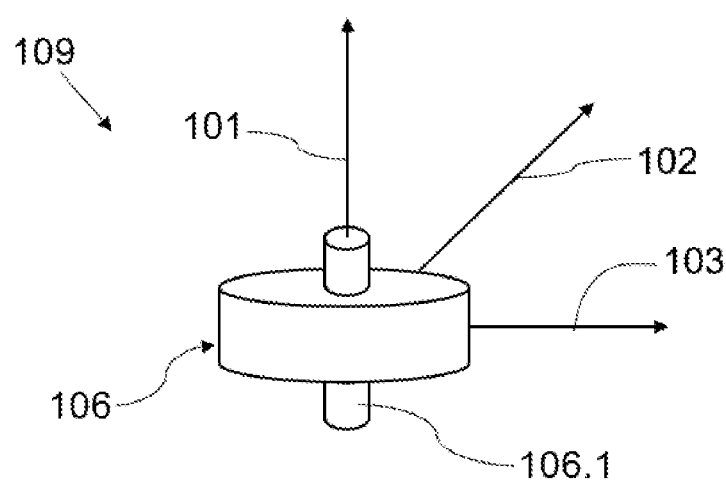
FIG. 2 is a schematic representation of a gyroscope of an actively controlled gyroscopic stabilization system.

Each gyroscopic stabilization system comprises a gyroscope 109, which is a device for measuring or maintaining orientation, based on the principles of conservation of angular momentum. The gyroscope 109 is basically a flywheel 106 spinning around a rotation control axis 101 extending in a first direction, that preferably (but not limited to) coincides with the longitudinal axis 1.0L of the corresponding blade 1.0, and further comprises a first rigid body control axis 102 extending in a second direction different from the first direction and a second rigid body control axis 103 extending in a third direction different from the first and second directions, as it is shown in FIG. 2. Preferably, the second direction is perpendicular to the first direction and the third direction is perpendicular to the first direction and to the second direction (as shown in FIG. 2).

A gyroscope 109 is arranged on the corresponding blade 1.0 (preferably attached) at any longitudinal position of said blade 1.0, as the nature of the movements to be compensated for are equally compensated for with the gyroscope 109 in any longitudinal position of the blade 1.0. As the gyroscope 109 is positioned on the blade 1.0, it also suffers the effects of the external factor causing the unwanted motions on the blade 1.0. In the same way, the external torques applied to the gyroscope 109 are also reflected in the body they are attached to (the blade 1.0 in this case). Therefore, actuating over the gyroscope 109 to generate reaction torques on said gyroscope 109 results in reaction torques on the blade 1.0, and controlling said actuation would result in generating the required reaction torques on the blade 1.0 to suppress at least partially the unwanted motions of said blade 1.0.

The application of controlled torques about an axis of the gyroscope 109 may produce reaction torques about another axis of the gyroscope 109, due to the nature of a gyroscope 109 (a known effect), and said reaction torques are caused also in the corresponding blade 1.0 as already explained. Therefore, actuating upon said gyroscope 109, by means of applying a controlled torque as described, the corresponding blade 1.0 to move conveniently (the reaction torque) can be forced, and said torques can be applied in such a way to generate reaction torques that oppose or counteract, at least partially, the unwanted motions of the blade 1.0.

Each gyroscopic stabilization system further comprises at least one respective sensor 1.S1, 1.S2 and 1.S3 to detect the motions of each blade 1.0 and at least one respective flywheel drive actuator configured to apply a torque to the corresponding gyroscope 109, in order to cause counter torques (reaction torques) on the blade 1.0. A flywheel drive actuator can comprise a motor or other known device capable of applying a torque over the gyroscope 109.

Each sensor 1.S1, 1.S2 and 1.S3 is preferably attached to the corresponding blade 1.0 and can be of any type capable of detecting rotary movements, such as azimuth position sensor, strain gauges, accelerometers or rotary encoders, for example. Thanks to the sensors 1.S1, 1.S2 and 1.S3, the motions (amplitude and direction) of each blade 1.0 can be known, and the reaction torques to be generated are also known then.

The control device 200 is independently communicated with the sensors 1.S1, 1.S2 and 1.S3 and with the flywheel drive actuators of the gyroscopic stabilization systems of the wind turbine 1, and it is configured for receiving signals from all the sensors 1.S1, 1.S2 and 1.S3. Each signal is representative of the motions of the corresponding blade 1.0, so that the control device 200 can know the motion properties of each blade 1.0 and the reaction torques that must be generated on the blade 1.0 to suppress the unwanted motions. Thus, the control device 200 is also configured for controlling the actuation of the flywheel drive actuators according to said received signals, controlling selectively the actuation of each flywheel drive actuator according to the signals from the sensor 1.S1, 1.S2 and 1.S3 associated to the corresponding blade 1.0, in order to apply the required controlled torques over the corresponding gyroscope 109 to generate the required reaction torques. The actuator(s) can be pneumatic, hydraulic or electric with the necessary technical properties to generate the required regulated torques of the flywheel 106 about the corresponding axis 102 and 103.

Thus, thanks to the sensors 1.S1, 1.S2 and 1.S3 and to the control device 200, controlled torques, and in the desired directions, can be applied to the gyroscopes 109 to cause the required reaction torques on the blades 1.0 to suppress unwanted motions of the blades 1.0. The control device 200 can comprise a control unit receiving all the signals from the sensors 1.S1, 1.S2 and 1.S3 and carrying out all the actuations upon all the flywheel drive actuators, or, alternatively, the control device 200 can comprise a control unit per blade 1.0, for example. A control unit can be a microprocessor, a processor, a FPGA, a controller or other kind of device capable of carrying out the described functions.

The gyroscopes 109 are selected in such a manner that their reactions are known. Therefore, it is also known the torques to be applied over them to generate the required reaction torques. This information can be preloaded in a memory (not shown in Figures) that can be integrated, or not, in the control device.

In a preferred embodiment, the flywheel 106 at least one gyroscopic stabilization system is free to move in respect of both rigid body control axes 102 and 103 in order to easily suppress the unwanted motions. In said embodiment, the gyroscopic stabilization system comprises a first flywheel drive actuator 2.1 to cause a torque of the flywheel 106 around the first rigid body control axis 102 and a second flywheel drive actuator 2.2 to cause a torque of the flywheel 106 around the second rigid body control axis 102, so that all the possible unwanted motions of the corresponding blade 1.0 can be compensated for. Alternatively, if required, the flywheel 106 of a gyroscopic stabilization system is free to move only in one of the rigid body control axes 102 and 103, the flywheel 106 being fix in respect of the other rigid body control axis 102 or 103. In this latter case, the gyroscopic stabilization system could comprise only one flywheel drive actuator.

Figure 3:
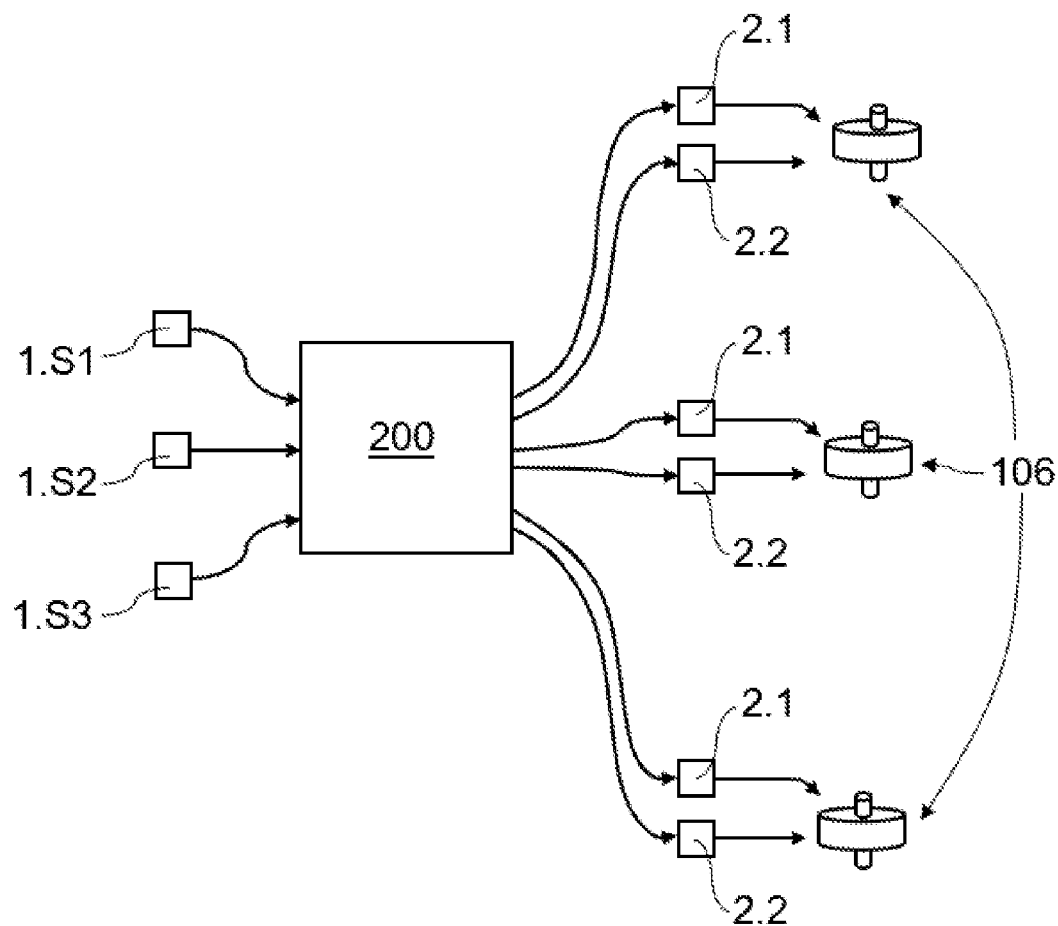
FIG. 3 is a schematic representation of the communications of the control device according to the preferred embodiment of the blade vibration suppression system.

In the preferred embodiment, as shown in FIG. 3, the flywheels 106 of all the gyroscopic stabilization system are free to move in respect of both rigid body control axes 102 and 103, and the gyroscopic stabilization system comprises a first flywheel drive actuator 2.1 to cause a torque of the flywheel 106 around the first rigid body control axis 102 and a second flywheel drive actuator 2.2 to cause a torque of the flywheel 106 around the second rigid body control axis 102. Alternatively, other configurations can also be possible, such as having all the flywheels 106 fixed in respect of the first rigid body control axis 102, or all the flywheels 106 fixed in respect of the second rigid body control axis 103 or a combination of the mentioned different possible configurations.

Each gyroscopic stabilization system can also comprise, in some configurations, an additional flywheel drive actuator, not shown in Figures, configured for actively controlling the rotation speed of the corresponding flywheel 106 in respect of the rotation control axis 101. The flywheel 106 comprises a shaft 106.1, extending longitudinally in the direction of the rotation control axis 101, and said additional flywheel drive actuator can be a motor whose rotor is attached to said shaft 106.1, for example. In one configuration, said actuator can comprise a synchronous motor in order to control the rotation speed (to maintain it constant, for example, if so required). Thanks to said rotation control, more precise torques of the flywheels 106 can be generated, the unwanted motion of the blades 1.0 being more precisely compensated for. The actuator can be pneumatic, hydraulic or electric with the necessary technical properties to generate the required regulated torques of the flywheel 106 about the rotation control axis 101.

In some configurations, the gyroscopic stabilization system can also comprise an additional sensor for detecting the rotation speed of the corresponding flywheel 106 in respect of the rotation control axis 101. In these configurations, the control device 200 is also communicated with the additional sensor(s), and, therefore, it causes the actuation of the additional flywheel drive actuator according to the signals received from said sensor(s) in order to control the rotation speed as required. The additional sensor(s) can be attached to the shaft 106.1 of flywheel 106, for example, although other alternatives for detecting the rotation speed can also be used.

Another aspect of embodiments of the invention refers to a method for suppressing the blade vibration of a wind turbine 1 comprising a plurality of blades 1.0. The method is implemented by means of a blade vibration suppression system comprising at least one actively controlled gyroscopic stabilization system for each blade.

Each gyroscopic stabilization system comprises a gyroscope 109 with a rotation control axis 101 extending in a first direction, a first rigid body control axis 102 extending in a second direction different from the first direction, a second rigid body control axis 103 extending in a third direction different from the first and second directions and a flywheel 106 rotatable in respect of the rotation control axis 101 and free to move in respect of at least one of the rigid body control axes 102 and 103. The gyroscopic stabilization system further comprises at least one flywheel drive actuator configured to apply a controlled torque to the gyroscope 109. Preferably, the second direction is perpendicular to the first direction and the third direction is perpendicular to the first direction and to the second direction.

In any embodiment or configuration of the method, for each blade 1.0, motions of the corresponding blade 1.0 are measured or detected and, according to said measurements, a controlled torque is applied over the corresponding gyroscope 109 by means of the corresponding flywheel drive actuator, to generate required reaction torques on said gyroscope 109, and consequently on the corresponding blade 1.0, to suppress at least partially said measured motions.

The method is implemented by means of a blade vibration suppression system as the one described before for the other aspects of the embodiments of the invention. The method comprises, then, different configurations or embodiments, each one adapted for each respective configuration or embodiment of the other aspects of embodiments of the invention.

Therefore, the method is adapted for applying a respective controlled torque over the gyroscope 109 in respect of both rigid body axes 102 and 103 for the gyroscopic stabilization systems where the flywheel 106 is free to move in respect of both rigid body control axes 102 and 103 and where said gyroscopic stabilization system comprises a first flywheel drive actuator 2.1 associated to the first rigid body control axis 102 and a second flywheel drive actuator 2.2 associated to the second rigid body control axis 103; and the method is adapted for applying a controlled torque over the flywheel 106 in respect of rigid body axes 102 or 103 for the gyroscopic stabilization systems where the flywheel 106 is free to move in respect of said rigid body control axes 102 or 103 but not in respect of the other rigid body axis 102 or 103.

The invention claimed is:

1. A blade vibration suppression system for a wind turbine having a plurality of blades, wherein the blade vibration suppression system comprises:
   at least one actively controlled gyroscopic stabilization system attached to each respective blade at a longitudinal position along the respective blade,
   wherein the at least one actively controlled gyroscopic stabilization system includes,
      a gyroscope with a rotation control axis extending in a first direction, a first rigid body control axis extending in a second direction different from the first direction, a second rigid body control axis extending in a third direction different from the first and second directions, and a flywheel rotatable in respect of the rotation control axis and free to move in respect of the first and second rigid body control axes,
      at least one flywheel drive actuator configured to apply a torque to the gyroscope, and
      at least one sensor arranged on the respective blade and configured to detect the motions of the respective blade,
   wherein the blade vibration suppression system further comprises at least one control device in communication with each respective sensor and with each respective at least one flywheel drive actuator,
   the control device being configured for receiving signals representative of the motion of the each respective blade from each respective sensor and for controlling the actuation of each respective at least one flywheel drive actuator according to said received signals in order to apply at least one controlled torque over the respective gyroscope to generate reaction torques on the respective gyroscope about the required axes that oppose or counteract the detected motions of the respective blade.

2. The blade vibration suppression system according to claim 1, wherein the flywheel of the at least one gyroscopic stabilization system is free to move in respect of both rigid body control axes, said gyroscopic stabilization system comprising a first flywheel drive actuator of the at least one flywheel drive actuator configured to cause a torque over the gyroscope about the first rigid body control axis and a second flywheel drive actuator of the at least one flywheel drive actuator configured to cause a torque over the gyroscope about the second rigid body control axis,
   the control device being configured for receiving signals representative of the motion of the corresponding blade from the sensor of said gyroscopic stabilization system and for controlling said first and second flywheel drive actuators to apply a torque over the corresponding gyroscope and about the corresponding axis according to the signals received from said sensor, to suppress unwanted motions of said blade.

3. The blade vibration suppression system according to claim 2, wherein the flywheels of all the gyroscopic stabilization systems of the blade vibration suppression system of a wind turbine are free to move in respect of both rigid body control axes.

4. The blade vibration suppression system according to claim 1, wherein at least one of the gyroscopic stabilization systems of the blade vibration suppression system comprises an additional flywheel drive actuator of the at least one flywheel drive actuator configured for actively controlling the rotation speed of the corresponding flywheel in respect of the rotation control axis,
   the control device being further communicated with said additional flywheel drive actuator and being further configured for controlling the actuation upon the additional flywheel drive actuator according to control said rotation speed.

5. The blade vibration suppression system according to claim 4, wherein the gyroscopic stabilization system of the blade vibration suppression system comprising the additional flywheel drive actuator further comprises an additional sensor for detecting the rotation speed of the corresponding flywheel in respect of the rotation control axis, said additional sensor being preferably attached to a shaft of said flywheel, said shaft extending in the direction of the rotation control axis.

6. A wind turbine comprising:
   a plurality of blades and a blade vibration suppression system, wherein the blade vibration suppression system includes a plurality of actively controlled gyroscopic stabilization systems and at least one control device in communication with the plurality of actively controlled gyroscopic stabilization systems of the blade vibration suppression system,
   wherein each actively controlled gyroscopic stabilization system comprises:
   a gyroscope attached at a longitudinal position along the blade with a rotation control axis extending in a first direction, a first rigid body control axis extending in a second direction different from the first direction, a second rigid body control axis extending in a third direction different from the first and second directions, and a flywheel rotatable in respect of the rotation control axis and free to move in respect of the rigid body control axes,
   at least one flywheel drive actuator configured to apply a torque over the gyroscope, and
   at least one sensor arranged on the corresponding blade and configured to detect the motions of
      the corresponding blade,
      wherein the at least one control device is in communication with each respective at least one sensor and with each respective at least one flywheel drive actuator, the at least one control device being configured for receiving signals representative of the motion of the corresponding blade from the respective sensor and for controlling the actuation of the respective at least one flywheel drive actuator according to said received signals in order to generate a counter torque upon the corresponding flywheel to suppress unwanted motions of the corresponding blade.

7. The wind turbine according to claim 6, wherein the flywheel of the at least one gyroscopic stabilization system is free to move in respect of both rigid body control axes, said gyroscopic stabilization system comprising a first flywheel drive actuator of the at least one flywheel drive actuator associated to the first rigid body control axis and a second flywheel drive actuator of the at least one flywheel drive actuator associated to the second rigid body control axis,
   the control device being configured for receiving signals representative of the motion of the corresponding blade from the sensor of said gyroscopic stabilization system and for controlling said first and second flywheel drive actuators to apply a torque upon the corresponding flywheel according to the signals received from said sensor, to suppress unwanted motions of said blade.

8. The wind turbine according to claim 7, wherein the flywheels of all the gyroscopic stabilization systems of the blade vibration suppression system of a wind turbine are free to move in respect of both rigid body control axes.

9. The wind turbine according to claim 6, wherein at least one of the gyroscopic stabilization systems of the blade vibration suppression system comprises an additional flywheel drive actuator of the at least one flywheel drive actuator configured for actively controlling the rotation speed of the corresponding flywheel in respect of the rotation control axis,
the control device being further communicated with said additional flywheel drive actuator and being further configured for controlling the actuation upon the additional flywheel drive actuator in order to control said rotation speed.

10. The wind turbine according to claim 9, wherein at least one of the gyroscopic stabilization systems of the blade vibration suppression system comprising the additional flywheel drive actuator further comprises an additional sensor for detecting the rotation speed of the corresponding flywheel in respect of the rotation control axis, said additional sensor being preferably attached to a shaft of said flywheel, said shaft extending in the direction of the rotation control axis.

11. The wind turbine according to claim 9, wherein all the gyroscopic stabilization systems of the blade vibration suppression system comprise an additional sensor for detecting the rotation speed of the corresponding flywheel in respect of the rotation control axis and the additional flywheel drive actuator configured for actively controlling said rotation speed,
the control device being further communicated with all the additional sensors and with all the additional flywheel drive actuators, and being configured for receiving signals representative of the rotation speed of the flywheels from said additional sensors and for controlling the actuation of the additional flywheel drive actuators according to the signals received from the corresponding sensors to control the corresponding rotation speed.

12. The wind turbine according to claim 11, wherein each additional sensor is attached to a shaft of the corresponding flywheel, said shaft extending in the direction of the rotation control axis each the flywheel comprises a shaft extending in the direction of the rotation control axis.

13. A method for suppressing, at least partially, the vibration of the blades of
a wind turbine,
wherein the method is implemented by a blade vibration suppression system comprising at least one actively controlled gyroscopic stabilization system for each blade,
wherein each gyroscopic stabilization system comprises:
a gyroscope attached at a longitudinal position along a blade with a rotation control axis, a first rigid body control axis extending in a direction different from the direction of the rotation axis, a second rigid body control axis extending in a direction different from the direction of the rotation axis and from the direction of the first rigid body control axis, and a flywheel rotatable in respect of the rotation control axis and free to move in respect of the rigid body control axes, and
at least one flywheel drive actuator configured to apply a torque over the gyroscope,
wherein, for each blade, motions of the corresponding blade are measured or detected and, according to said measurements, a controlled counter torque over the corresponding gyroscope is applied by a corresponding flywheel drive actuator of the at least one flywheel drive actuator, to generate reaction torques on said gyroscope that oppose or counteract the detected motions of the blades.

14. The method according to claim 13, adapted for applying a respective controlled torque over the flywheel in respect of both rigid body axes for the gyroscopic stabilization systems where the flywheel is free to move in respect of both rigid body control axes and where said gyroscopic stabilization system comprises a first flywheel drive actuator of the at least one flywheel actuator associated to the first rigid body control axis and a second flywheel drive actuator of the at least one flywheel drive actuator associated to the second rigid body control axis.

15. The method according to claim 13, adapted for applying a controlled torque over the flywheel in respect of one of the rigid body axes for the gyroscopic stabilization systems where the flywheel is free to move in respect of the first rigid body control axis but not in respect of the second rigid body axis.

* * * * *